F. J. BARDO.
CHECK VALVE.
APPLICATION FILED APR. 20, 1912.
1,038,518.
Patented Sept. 17, 1912.
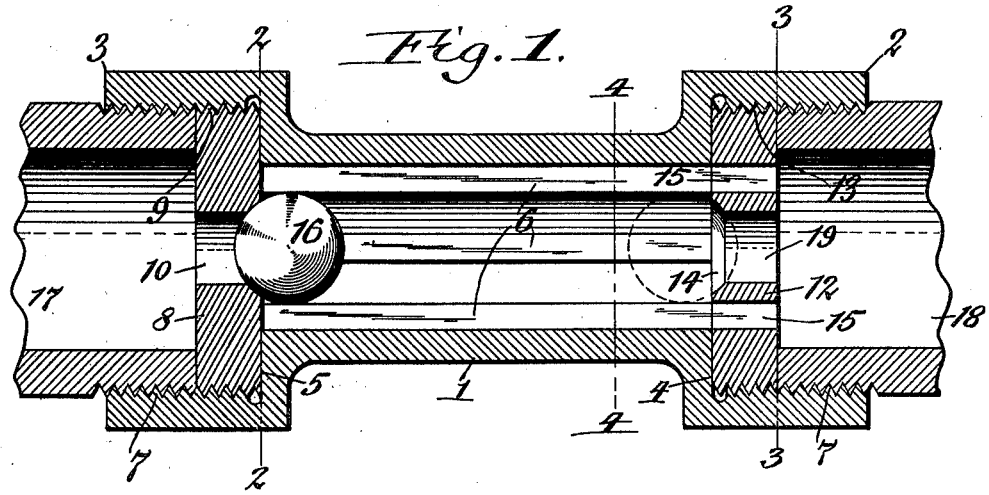

UNITED STATES PATENT OFFICE.

FRED J. BARDO, OF BUFFALO, NEW YORK.

CHECK-VALVE.

1,038,518.  Specification of Letters Patent.  Patented Sept. 17, 1912.

Application filed April 20, 1912. Serial No. 692,106.

*To all whom it may concern:*

Be it known that I, FRED J. BARDO, a citizen of the United States, residing at Buffalo, in the county of Erie and State of New York, have invented new and useful Improvements in Check-Valves, of which the following is a specification.

This invention relates to a check valve and has the object to produce a valve of this character which is simple and inexpensive in construction and not liable to get out of order and which can be easily installed and also readily repaired when necessary.

In the accompanying drawings: Figure 1 is a longitudinal section of my improved check valve interposed between the two sections of the pipe, tube or conduit. Figs. 2, 3 and 4 are transverse sections in the correspondingly numbered lines in Fig. 1.

Similar characters of reference indicate corresponding parts throughout the several views.

The casing of my improved check valve may be variously constructed but as shown in the drawings the same preferably comprises a longitudinal contracted central part or body 1 which is preferably of cylindrical form in cross section, and two enlarged cup-shaped ends or sockets 2, 3 arranged at the front and rear ends of the central part forming an internal shoulder 4 between the front socket and the body which faces forwardly and an internal rearwardly facing shoulder 5 between the rear socket and the rear end of the body. Within the bore of the body the same is provided with a plurality of longitudinal guide ribs 6, four of such ribs being employed by preference, as shown in Fig. 4. Each of the sockets of the body is preferably provided with an internal screw thread 7, as shown in Fig. 1.

Within the rear socket of the valve casing is arranged a valve disk 8 which is preferably held in place by providing the same with an external screw thread 9 on its periphery which engages with the internal thread of the rear socket. This valve disk is preferably screwed into the rear socket until its front side bears against the rearwardly facing shoulder of the valve casing. At its center the valve disk is provided with an axial part 10 the front end of which is beveled so as to form the valve seat 11 proper.

Within the front socket of the valve casing is arranged a stop disk 12 which is also secured therein by providing the periphery thereof with an external screw thread 13 which engages with the internal thread of a front socket and is screwed inwardly in this socket until its rear side bears against the forwardly facing front shoulder of the valve casing. At its center this stop disk is provided with an axial relief opening 19 the rear end of which is flared rearwardly, as shown at 14, and around this central opening the stop disk is provided with a plurality of side openings or passageways 15 which are arranged in an annular row, each of said side openings being in line or registering with the space between two adjacent guide ribs of the casing.

16 represents a valve stopper preferably of ball-shape, as shown, and arranged within the body and adapted to engage at its surface with the inner edges of the guide ribs and also with the beveled or flaring seats of the valve disk and the stop disk.

17, 18 represent the two sections of a pipe, tube or conduit of which the check valve forms a part, the opposing ends of these sections being preferably connected with the front and rear sockets by providing the same with external screw threads which engage with the internal threads of the sockets respectively. These pipe sections are preferably screwed into the socket until their inner ends bear against the outer sides of the front and rear disks and thereby aid in holding the latter in place within the casing.

While the liquid, gas or other medium is passing forwardly through the conduit and the valve casing the ball stopper is moved forwardly away from the valve disk until it engages with the stop disk, as indicated by dotted lines in Fig. 1. In this position of the ball stopper the fluid passes from the rear pipe section through the port of the valve disk, thence lengthwise through the body of the casing and through the plurality of side openings in the stop disk and to the front pipe section. While the medium is thus passing through the valve casing its flow is distributed uniformly through the several side openings of the stop disk without any material deviation in the course of the medium, thereby reducing the resistance to the flow of the same to a minimum. By engaging the stopper with the stop disk at the rear end of the relief opening the stopper is permitted to remain firmly in engagement with the stop disk and thereby prevent chattering of the stopper during normal forward flow of the medium through the valve. Whenever the medium which is being conducted tends to flow backwardly due to back pressure or other causes the stopper rolls quickly from the stop disk into engagement with the seat of the valve disk, as shown by full lines in Fig. 1, thereby promptly checking the back flow of the pressure medium and preventing the further back flow of the same.

My improved check valve is particularly desirable for use where checking of the backward flow of the pressure medium needs to be arrested promptly and also for purposes in which the liquid which is being conducted should flow forwardly as direct as possible so as to reduce the agitation of the medium. My improved construction of check valve permits of accomplishing this purpose at comparatively low cost without the employment of any delicate parts which are liable to get out of order, thereby causing this valve to perform its operation without requiring frequent adjustment or repairs.

I claim as my invention:

1. A check valve comprising a casing having a body provided with internal longitudinal guide ribs and sockets at its front and rear ends, a valve disk arranged in the rear socket and provided with a central port, a stop disk arranged in the front socket and provided with an annular row of openings around the center thereof, and a stopper movable lengthwise on the inner edges of said ribs and capable of engaging with the valve disk for closing the port thereof and preventing backward movement through the valve of the medium which is being conducted or of engaging the stop disk and permitting the flow of said medium through the valve.

2. A check valve comprising a casing having a reduced body provided with internal longitudinal guide ribs and enlarged internally threaded sockets at the front and rear ends of the body forming forwardly and rearwardly facing shoulders at the front and rear ends of the body, a rear valve disk arranged in the rear stopper and engaging with said rear shoulder and having an external thread engaging with the internal thread of the respective socket and also provided centrally with a port, a front stop disk arranged in the front socket and engaging with said front shoulder and having an external screw thread engaging with the internal thread of the respective socket and also provided with a central opening and with an annular row of openings around said central opening, each opening of the annular row being in line with the space between two adjacent ribs of the body, and a ball stopper movable lengthwise in the body on the inner edges of said ribs and adapted to engage the front side of the valve disk for closing the port thereof or the rear side of the stop disk over the rear end of the central opening thereof.

Witness my hand this 18th day of April, 1912.

FRED J. BARDO.

Witnesses:
THEO. L. POPP,
ANNA HEIGIS.